US006286099B1

(12) United States Patent
Kramer (10) Patent No.: US 6,286,099 B1
(45) Date of Patent: Sep. 4, 2001

(54) DETERMINING POINT OF INTERACTION DEVICE SECURITY PROPERTIES AND ENSURING SECURE TRANSACTIONS IN AN OPEN NETWORKING ENVIRONMENT

(75) Inventor: Glenn A. Kramer, San Francisco, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/121,796

(22) Filed: Jul. 23, 1998

(51) Int. Cl.[7] .................................................. G06F 11/30
(52) U.S. Cl. ............................................. 713/172; 705/76
(58) Field of Search ............................. 380/285; 705/76; 713/155, 194, 169, 173

(56) References Cited

U.S. PATENT DOCUMENTS

| | | | |
|---|---|---|---|
| 5,557,518 | * 9/1996 | Rosen | 705/69 |
| 5,621,797 | * 4/1997 | Rosen | 705/76 |
| 5,642,419 | * 6/1997 | Rosen | 705/76 |
| 5,703,949 | * 12/1997 | Rosen | 705/65 |
| 5,712,914 | 1/1998 | Aucsmith et al. | 380/30 |
| 5,790,677 | * 8/1998 | Fox et al. | 705/78 |

FOREIGN PATENT DOCUMENTS

| | | | |
|---|---|---|---|
| WO 97/43716 | 11/1997 | (WO) | G06F/13/00 |
| WO 97/50207 | 12/1997 | (WO) | H04L/9/32 |

OTHER PUBLICATIONS

R.E. Lennon, et al., IBM Technical Disclosure Bulletin, "Application For Personal Key Crypto With Insecure Terminals", vol. 24, No. 1B, pp. 561–565 (Jun. 1981).

D. Chaum, "Security Without Identification: Transaction Systems To Make Big Brother Obsolete", Communications of the ACM, vol. 28, No. 10, pp. 1030–1044 (Oct. 1985).

D.M. Nessett, "Layering Central Authentication on Existing Distributed System Terminal Services", Proceedings 1989 IEEE Computer Society Symposium on Security and Privacy, pp. 290–299 (May 1–3 1989).

S. Russell, "Paradigms For Verification Of Authorization At Source Of Electronic Documents In An Integrated Environment", Eighth Annual Computer Security Applications Conference, IEEE Computer Society Press, pp. 203–209 (Nov. 30–Dec. 4, 1992).

H. T. Jung, et al., "Caller Identification System In The Internet Environment", UNIX Security Symposium IV, pp. 69–78 (Oct. 4–6, 1993).

R. Molva, et al., "Authentication Method With Impersonal Token Cards", IEEE, pp. 56–65 (1993).

S. Russell, "Transparent Cosignatures For Electronic Documents", IEEE Proceedings Ninth Annual Computer Security Applications Conference, pp. 82–91 (Dec. 6–10, 1993).

(List continued on next page.)

*Primary Examiner*—Thomas R. Peeso (57) ABSTRACT

The present invention provides for determining point of interaction device security properties for secure transmission of a transaction between a plurality of electronic devices, such as point of interaction (POI) devices or computer systems (or both), over a public communication system, such as the Internet. In one embodiment, a communication is established between a first electronic device and a second electronic device using a public network. Digital certificates are then exchanged to validate the parties and to provide a secure channel for transmission of data. Device security properties of the first electronic device are determined based on information transmitted by the first electronic device to the second electronic device thereby allowing the second electronic device to accept or reject a transaction request from the first electronic device based (in part) on the device security properties of the first electronic device.

34 Claims, 7 Drawing Sheets

OTHER PUBLICATIONS

V. Bharghavan, "Secure Wireless LANs", 2nd ACM Conference On Computer And Communications Security, pp. 10–17 (Nov. 2–4, 1994).

R. Kailar, "Reasoning About Accountability In Protocols For Electronic Commerce", 1995 IEEE Symposium on Security and Privacy, pp. 236–250 (May 8–10, 1995).

M. Jakobsson, et al., "Revokable and Versatile Electronic Money", 3rd ACM Conference on Computer and Communications Security, pp. 76–87 (Mar. 14–16, 1996).

C. Serban, et al., "Run–Time Security Evaluation (RTSE) for Distributed Applications", Proceedings 1996 IEEE Symposium on Security and Privacy, pp. 222–232 (May 6–8, 1996).

B. Askwith, et al., "Achieving User Privacy In Mobile Networks", IEEE Thirteenth Annual Computer Security Applications Conference, pp. 108–116 (Dec. 8–12, 1997).

M. Naor, "Certificate Revocation and Certificate Update", Seventh USENIX Security Symposium Proceedings, pp. 217–228 (Jan. 26–29, 1998).

P. T. Devanbu, et al., "Techniques for Trusted Software Engineering", Proceedings Forging New Links 20th International Conference on Software Engineering, IEEE Computer Society, pp. 126–135 (Apr. 19–25, 1998).

* cited by examiner

Figure 1

PRIOR ART

Figure 2

PRIOR ART

1. Device is sent a challenge by FI; uses challenge to determine authenticity of FI.
2. Device responds to challenge, allowing FI to determine device ID.
3. Device ID, plus additional info provided by device, used to determine device manufacturer and device security properties.
4. FI decides to allow or disallow requested transaction, based on device properties and manufacturer.

DETERMINING POINT OF INTERACTION DEVICE SECURITY PROPERTIES AND ENSURING SECURE TRANSACTIONS IN AN OPEN NETWORKING ENVIRONMENT

FIELD OF THE INVENTION

The present invention relates to secure, electronic payment in exchange for goods and services purchased over a communication network, and more specifically, to determining the security properties of the hardware devices and any accompanying software used in the payment network, for the purpose of allowing financial institutions to allow or disallow specific types of transactions based on the security properties of the device. A preferred embodiment of the invention facilitates public key cryptography for securely transmitting transactions over a public communication network in a manner that is independent of any specific financial institution is provided.

BACKGROUND

Today, approximately 2 trillion dollars worth of purchases are made yearly over the worldwide credit and debit networking systems. Also, approximately 350 billion coin and currency transactions occur between individuals and institutions every year. As smart card technology matures (e.g., a smart card is a credit card with built-in memory (and optionally a microprocessor) that can be used as an identification or financial transaction card that can also store personal or transaction information), many of these transactions will take place electronically. Home banking programs allow consumers to pay bills and transfer money between accounts, all from the privacy of their own homes. Soon, with electronic cash, these same consumers will be able to download value from their banks without leaving home. Throughout the history of commerce, economic exchange has generally sought greater convenience at a lower cost, while achieving improved security.

In transactions that take place over networks (e.g., a consumer sending payment details to a merchant, or the merchant requesting transaction approval from a bank), it is desirable for the devices used by consumers and merchants to have specific security properties. In many cases, the security properties are mandated by government regulation; in other cases, the specific financial institution may have requirements that are more stringent than the government requirements.

Credit card networks generally transmit only information that is easily obtainable elsewhere. For example, the card number transmitted is also plainly visible as embossed on the face of the credit card. For these reasons, many governments limit the liability of the cardholder in the case of theft of the card number.

Online debit networks and Automatic Teller Machine (ATM) networks require the use of a Personal Identification Number (PIN) to authorize a transfer of funds. Various governmental and financial institution regulations stipulate that the devices used to capture a PIN and transmit it to a financial institution incorporate encryption and that the devices be tamperproof. Generally, the properties of such a device include the majority of the following:

An encryption key utilizing a symmetric key algorithm like Data Encryption Standard (DES) (a standard method of coding information into ciphertext), stored in a non-volatile memory such as an Electrically Erasable Programmable Read Only Memory (EEPROM), for securely transmitting debit card PINs.

A keypad for entering PINs for debit cards and smart cards.

A casing that detects whether the device is being tampered with for the purpose of altering the electronics or determining the key.

A mechanism for zeroing the device memory, including any keys and transaction history, in the event that the device is tampered with.

In some cases, sophisticated shielding, such as a Faraday cage, that ensures the device does not give off any electromagnetic radiation that would allow instrumentation measuring such radiation to determine which keys are pressed on the keypad of the device.

The financial institution that purchases such devices (e.g., Point of Sale (POS) terminals or Automated Teller Machines (ATMs)), specifies the requirements for their devices and ensures, via a certification process, that the devices are compliant with any governmental or card association regulations, as well as with the transaction processing environment at the particular financial institution.

Recently, electronic commerce has expanded to include interactions with consumers in their own homes using either private or public networks such as the Internet. It is desirable for the merchant to transmit information, including a subset of the information provided by the customer, over such a network to a payment gateway computer system that is designated, by a bank or other financial institution that has the responsibility of providing payment on behalf of the customer, to authorize a commercial transaction on behalf of such a financial institution, without the risk of exposing that information to interception by third parties. Such institutions include, for example, financial institutions offering credit card or debit card services.

One such attempt to provide such a secure transmission channel is a secure payment technology, such as Secure Electronic Transaction (SET), jointly developed by the Visa and MasterCard card associations, and described in Visa and MasterCard's Secure Electronic Transaction (SET) Specification Version 1.0, May 31, 1997 (available via for download via www.setco.org/SET_Specifications.html), incorporated herein by reference in its entirety.

Another such attempt to provide such a secure transmission channel is a general-purpose secure communication protocol such as Netscape, Inc.'s Secure Sockets Layer (SSL), as described in Freier, Karlton & Kocher (hereinafter "Freier"), The SSL Protocol Version 3.0, March 1996, and incorporated herein by reference in its entirety. SSL allows for secure transmission between two computers. SSL advantageously does not require special-purpose software to be installed on the customer's computer, because it is already incorporated into commercially and widely available software that many people utilize as their standard Internet access medium and advantageously does not require that the customer interact with any third-party certification authority. Instead, the support for SSL can be incorporated into software already in use by the customer (e.g., the Netscape Navigator™ World Wide Web browsing tool).

SUMMARY

The present invention provides for determining point of interaction device security properties for secure transmission of a transaction between a plurality of electronic devices, such as point of interaction (POI) devices or computer systems (or both), over a public communication system, such as the Internet. In one embodiment, a communication is established between a first electronic device and a second electronic device using a public network. Digital certificates are then exchanged to validate the parties and to provide a secure channel for transmission of data. Device security properties of the first electronic device are determined based on information transmitted by the first electronic device to the second electronic device thereby allowing the second electronic device to accept or reject a transaction request from the first electronic device based (in part) on the device security properties of the first electronic device.

BRIEF DESCRIPTION OF THE DRAWINGS

The foregoing and other aspects and advantages of the present invention will become apparent from the following detailed description with reference to the drawings, in which.

DETAILED DESCRIPTION

Open network-based payment solutions require additional security measures that are not found in conventional POS terminals. This additional security measures requirement is necessitated, because Internet communication is done over publicly-accessible, unsecured communication lines in stark contrast to the private, secure, dedicated phone or leased line service utilized between a traditional merchant and an acquiring bank. Thus, it is critical that any solution utilizing the Internet for a communication backbone employ some form of cryptography.

In the near future, it is likely that banks will become dissatisfied with software-only transaction security and will require the use of hardware at the consumer's location to consummate transactions. Such devices can be called point of interaction (POI) devices, which denotes their expanded role beyond conventional POS devices located at the physical premises of merchants.

About twenty years ago, the only point of interaction between a retail customer and a bank was via personal interaction with a teller or bank representative, or by deposits of funds and credit card sales drafts. The advent of ATMs created a new point of interaction. ATMs were initially located on the bank's premises but available more hours than the branch itself. ATMs have now spread to, for example, supermarkets, airports, and the various ATM and debit networks now have bridges and gateways to allow interoperability with a vast number of card brands.

Additionally, many financial institutions now offer telephone, personal computer (PC), and Internet access to accounts. For example, Wells Fargo allows home banking and bill paying via telephone, PC, or the Internet. Similarly, Citibank has PC-based home banking, and Charles Schwab allows stock and mutual fund trading via telephone, the Internet, or its proprietary PC software.

Recent developments in electronic cash are now moving ATM functionality into the home such as with the VeriSmart™ PATM (Personal ATM) system from VeriFone, Inc. of Santa Clara, Calif. In addition to stand-alone devices such as the PATM, banks are exploring the use of smart-card enabled cell phones and Personal Digital Assistants (PDAs) as points of interaction.

Several important trends are emerging in this expansion of the POI. For example, financial institutions (FIs) are being challenged for control of the point of interaction. Proprietary standards such as Visa Interactive's ADMS (recently purchased by Integrion) may result in only a few devices for a given market place. On the other hand, openly-promulgated standards such as the Microsoft/Intuit/Checkfree OFX specification may attract a large number of vendors. The true "openness" of a standard depends not only on whether or not it is published, but it also depends heavily on such features as follows: (1) Size of the development community; (2) Channels for getting products based on the standard into the user community; (3) Reliance on other underlying open standards; (4) Number and diversity of the controlling entities; and (5) Flexibility and ease of implementation. Accordingly, truly open systems threaten to undermine the FIs' control of the point of interaction.

Further, today's certification criteria may no longer be practical. A corollary of the FIs' loss of control over the POI is that the application certification process will change. In the world of POS terminals, each FI controlled the certification of terminals connecting to its systems in a strict one-to-one relationship. In the future, this will likely be a many-to-many relationship, as software, cell phones, and various consumer devices are designed to interface to a large number of FIs using generic protocols. Certification will move from being specified and mandated by individual FIs to being controlled by a community of FIs, device vendors, and software manufacturers.

In addition, mission critical systems need to be more robust in the face of consumer software of highly variable quality. In the past, certification was used by FIs to ensure that input conditions that were hazardous to their legacy systems never reached those systems, because they were incapable of being generated by certified applications. With the increased need to allow a variety of open systems to connect to the FIs' infrastructure, the legacy systems need to be more robust. First, the number of different standards used will likely increase, and a layer of "adapters" will then be needed to convert these inputs to a form understood by the legacy systems. Second, there is no longer any guarantee that an application claiming to conform to a particular standard actually is fully compliant, which means that the adapters will have to be robust in handling unexpected device behavior.

Also, trust models, authentication procedures, and policies for "commoditized" secure environments will need to be developed. In the current security model for FIs, the FI essentially owns the relationship with the merchant and therefore can control the encryption keys that are in the merchant's terminal hardware. As the POI moves from merchant to consumer and as merchants move toward having multiple relationships with FIs, the FI will likely lose direct control of the security infrastructure for commodity software and hardware devices. The FI will then be forced to choose between adapting to the security models of non-certified commodity devices or foregoing certain transactions. One potential value of alliances of banks will be to a create a multi-bank certification infrastructure that is economical for device manufacturers to get certification "en masse" for a group of FIs.

Finally, anonymous electronic transactions will need to be supported. Today, information about the consumer flows through the FI's infrastructure with each transaction. As electronic cash becomes accepted, FIs will have to allow truly anonymous transactions to occur. In a preferred embodiment, cryptography and determination of specific device security properties to support a multi-bank certification infrastructure is disclosed.

A preferred embodiment of a system in accordance with the present invention is practiced in the context of a point of sale (POS) terminal, commonly found in merchant environments, but enabled as described herein to be used outside of the merchant environment. Such an enabled device will be called a point of interaction (POI) device, as its use is not limited to sale transactions.

Figure 1:
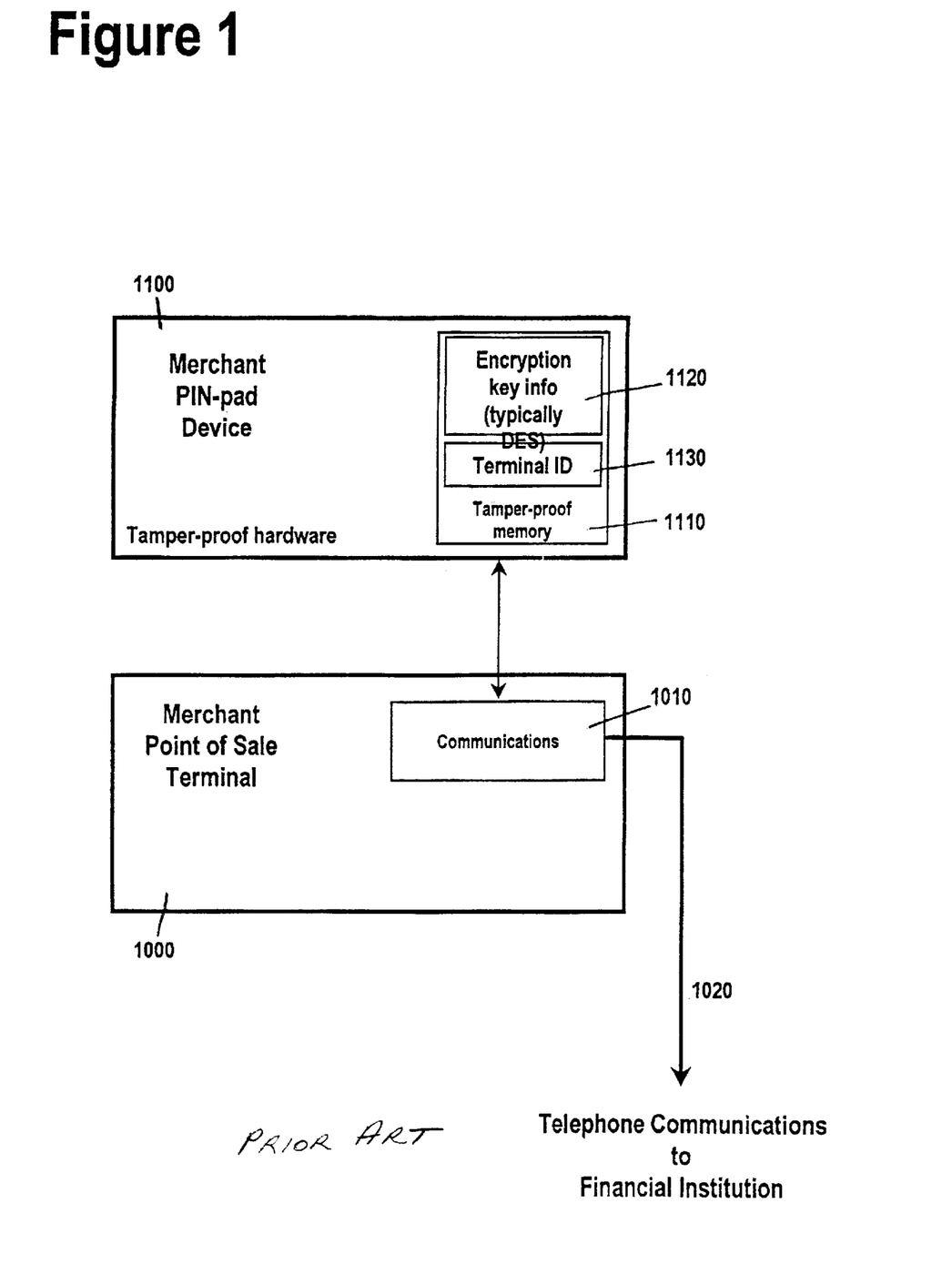
FIG. 1 illustrates a typical device configuration for securely capturing PINs of customers for transmission to the acquiring bank (for debit cards) or for validating the identity of the customer (for smart cards)

A representative hardware environment is depicted in FIG. 1. For credit card transactions, a conventional merchant point of sale (POS) terminal 1000 uses a conventional communications module 1010, such as a modem, to communicate via telephone line 1020 to a financial institution. For sensitive information, such as the PIN associated with a debit card, special hardware such as a PIN-pad 1100 is required. PIN-pad 1100 is tamper-proof and also uses a tamper-proof memory 1110 to store an encryption key 1120 and a Terminal ID (TID) 1130, which uniquely defines the device to the financial institution. Encryption key 1120 is typically a symmetric key such as that used in the DES standard and is "injected" into the device by or on behalf of the financial institution using high security standards. The financial institution stores encryption key 1120 and TID 1130 in a hardware security module (HSM) so that when given the TID, the HSM can retrieve the corresponding key. When data is transmitted from the POS device to the financial institution (FI), the data is sent mainly in the clear with sensitive data like the PIN encrypted. For encrypted fields, the FI's systems associate the encryption key with a specific terminal using the TID, which is provided in the clear in the transmission from the merchant POS device. The FI's computer then can decrypt the sensitive data using the appropriate encryption key, or instruct the hardware security module (HSM) 2110 to decrypt and re-encrypt the data under a different key for transmission to another host.

Figure 2:
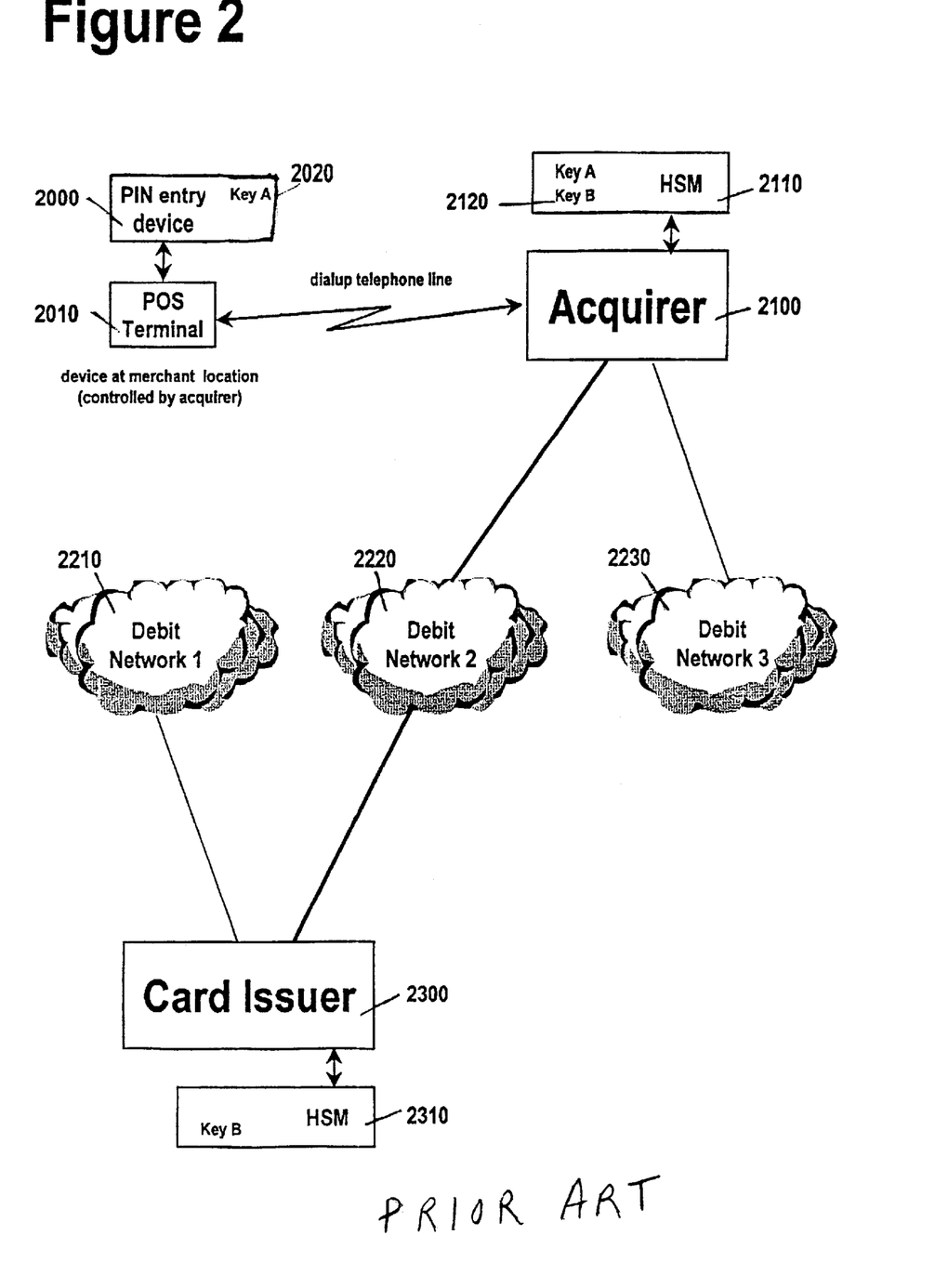
FIG. 2 illustrates the use of repeated point-to-point symmetric key encryption to protect the PIN during transmission from the merchant POS device to the card issuing bank, which is the accepted state of the art today.

FIG. 2 illustrates the merchant POS device in the context of a debit authorization system. In particular, the merchant's PIN entry device 2000 is connected to or an integral part of a POS terminal 2010 and contains a DES key A 2020. An acquirer bank 2100 has a hardware security module (HSM) 2110, which is used by the bank's computers for key storage and cryptographic operations. Acquirer 2100 decrypts the information received by the merchant POS device and reformats it for transmission to the debit card issuer 2300 for an approval for the transaction. As a part of this reformatting, acquirer 2100 may have an agreement with card issuer 2300 to share an encryption key B 2120 for point-to-point encryption of sensitive data between acquirer 2100 and card issuer 2300. In such a case, acquirer 2100 uses HSM 2110 to encrypt the data for transmission to card issuer 2300 via network 2220; the issuer then uses its HSM 2310 for decryption.

The arrangement of FIG. 2 works well when the POS device is owned by a merchant who has an acquiring relationship with a single bank or a small number of banks. In this case, the key management issues are minimal. However, when the device becomes a point of interaction device (POI device), located in a consumer's home, the key management issues become intractable. For example, consider the case in which the POI device is a magnetic stripe reader embedded in a computer keyboard. The reason for embedding the device in the keyboard is so that the PIN, when typed in, does not need to travel unencrypted to a computer program running in a memory of the computer, in which the computer program could be compromised or the keyboard device driver could be tampered with. Thus, for security purposes, the encryption process should also be executed inside the keyboard.

Also, consider the case in which the keyboard is used to make purchases from a variety of stores over the Internet. Merchant A uses bank A as an acquirer; merchant B uses bank B as an acquirer, and merchant C uses bank C as an acquirer. In the well-known scheme, a Data Encryption Standard (DES) key stored in the keyboard is typically not known by every possible bank that acquires merchant transactions, because any such distribution scheme would be prone to a number of security attacks. Thus, a consumer would need a first keyboard to transact business with merchants of bank A, a second keyboard to transact business with merchants of bank B, and a third keyboard to transact business with merchants of bank C. Clearly, this is impractical. Accordingly, the well-known scheme fails to solve the problem of determining point of interaction device security properties and ensuring secure transactions in an open networking environment.

Figure 3:
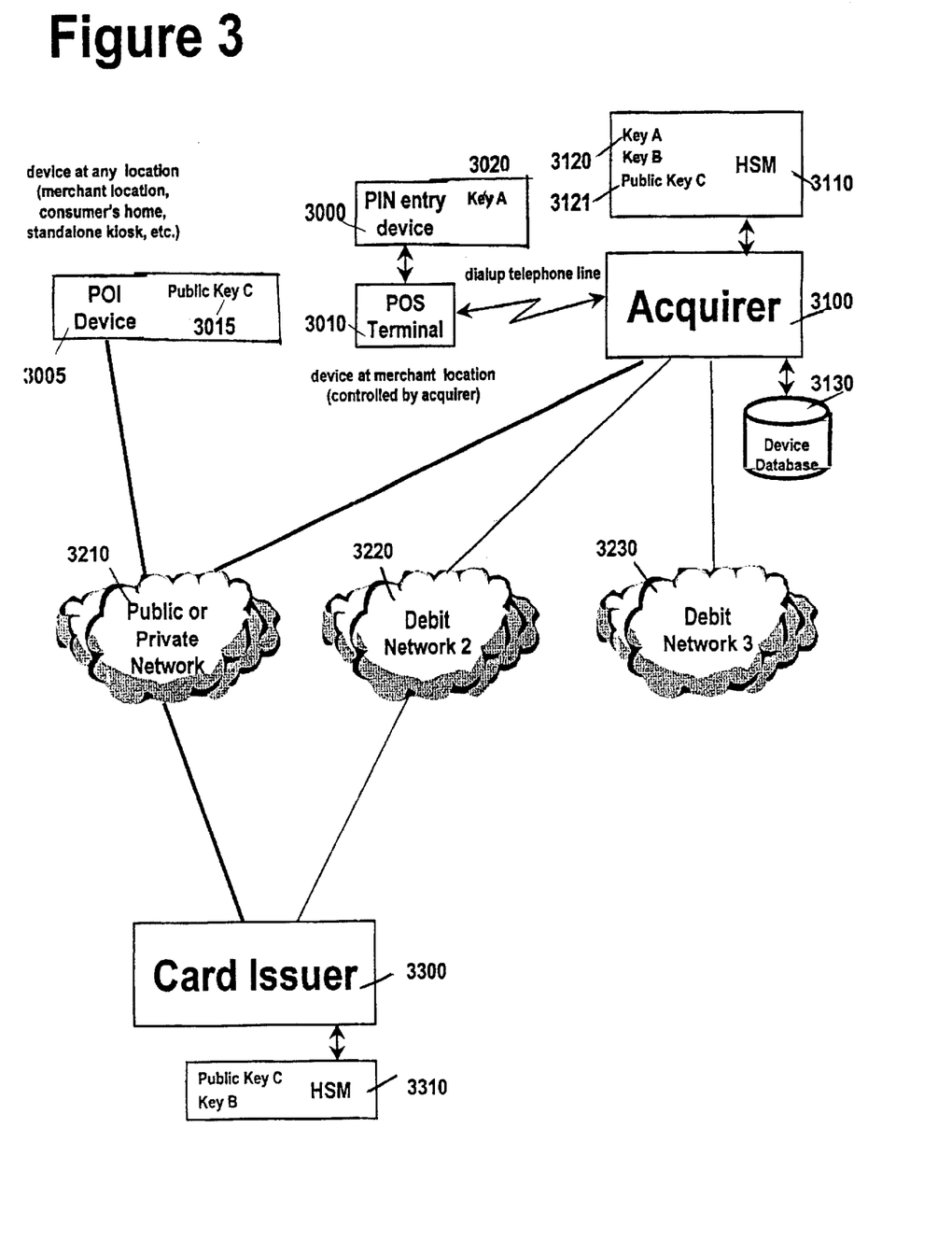
FIG. 3 illustrates the use of public key encryption to transmit the PIN securely from the point of interaction device to the card issuer, without the need to rely on an acquirer having control over the point of interaction device in accordance with a preferred embodiment of the invention.

FIG. 3 illustrates the use of a preferred embodiment in which this problem is solved. A point of interaction (POI) device 3005 contains a public-private key pair of an asymmetric encryption scheme such as the well-known RSA (Rivest Shamir Adleman) system or ECC (Elliptic Curve Cryptography). The private key component is known only to the device manufacturer and is embedded in POI device 3005 in a tamper-proof manner. A public key C 3015 can be embedded in a public key certificate, and either the raw key (public key C 3015) or the certificate containing public key C 3015 (depending on implementation constraints such as the amount of device memory available) can be obtained from POI device 3005 via a network query function. POI device 3005 also includes the public key of a consortium of banks (the consortium key) that wish to share the use of a pool of POI devices. The consortium key is known to all FIs, and the corresponding private key is used to sign public key certificates for all FIs participating in the consortium.

In this embodiment, a key exchange occurs between POI device 3005 and the FI prior to the exchange of financial data. Public key C 3015 is transmitted to an acquirer 3100, which can then send its public key certificate based on a public key C 3121 to POI device 3005. POI device 3005 can then determine whether it is communicating with a FI that is a consortium member by checking to see whether the public key certificate for public key C 3121 from the FI is digitally signed by the consortium key. This prevents POI device 3005 from being tricked or "spoofed" into providing sensitive data to an attacker.

If POI 3005 device indicates the desired transaction type when it is sending its public key certificate to the FI, then the FI can decide to accept or reject that type of transaction based upon specific device properties of POI device 3005. Acquirer 3100 can determine the device properties by looking up the device properties in a device properties database 3130. Database 3130 can be kept up to date by the manufacturers of POI devices 3005 and can either be distributed to all participating FIs, or it can be a service that is accessed over a network such as the Internet.

In one embodiment, the public key of POI device 3005 is signed by the public key of the manufacture (key M). Key M need not be stored on POI device 3005 itself but is accessible in device properties database 3130. The POI's device certificate includes a device type field, which serves as an index into device properties database 3130 to retrieve the device's properties, such as security properties. For example, the security properties of a particular device can indicate that the device includes a magnetic stripe reader embedded in a computer keyboard, and a standard encryption process executed inside the keyboard. The security properties can also indicate that the device is not certified by a certification authority.

POI device 3005 can communicate with a merchant's acquirer 3100 in the case that a retail commercial transaction is performed. However, if the transaction is a consumer-to-bank transaction, such as an electronic cash download or bill payment authorization via debit card, POI device 3005 can communicate directly with an issuer bank 3300, which issued the card. In FIG. 3, PIN entry device 3000, POS terminal 3010, HSM 3110, key A 3120, and HSM 3310 are the same as PIN entry device 2000, POS terminal 2010, key A 2020, and HSM 2310 of FIG. 2, respectively.

Figure 4:
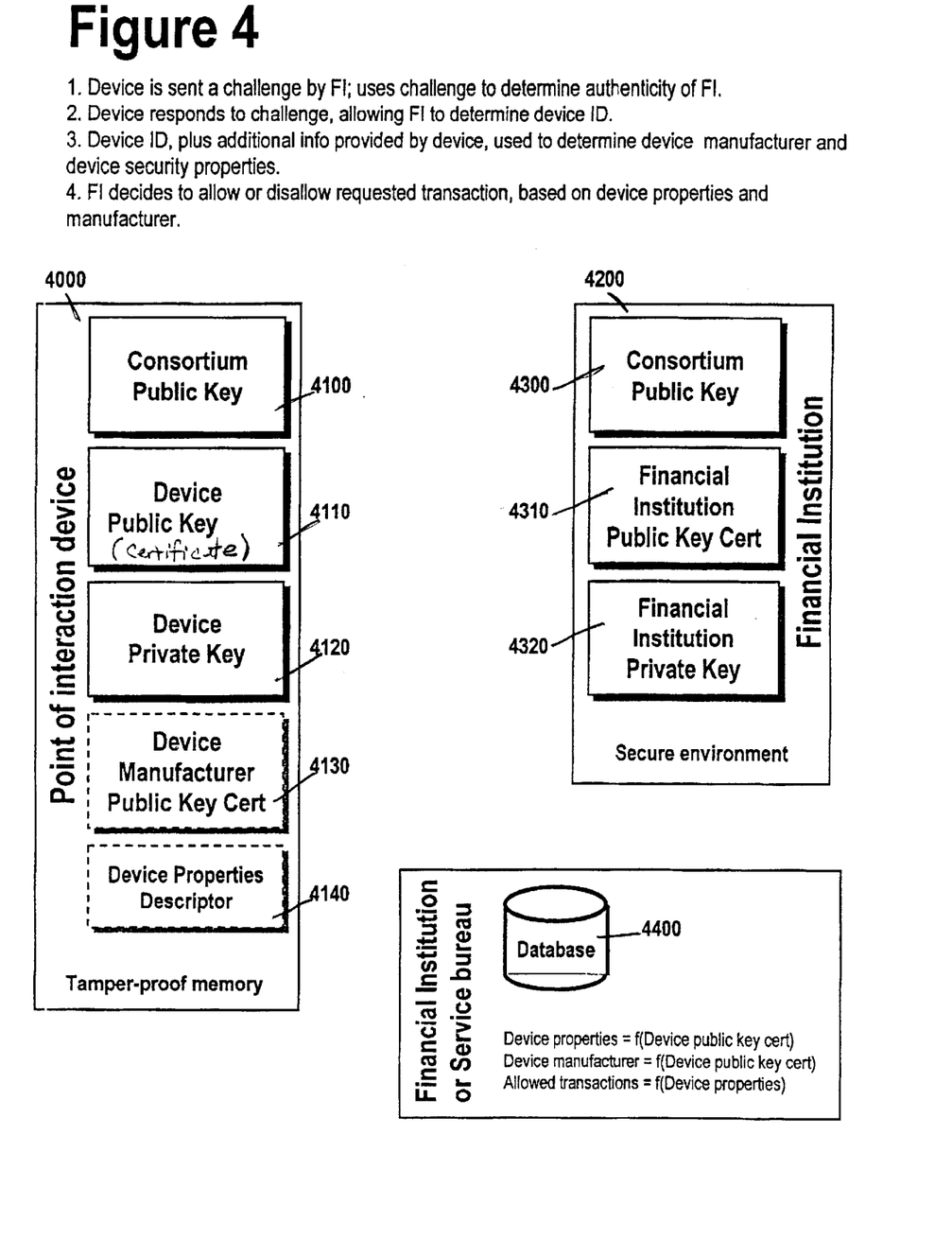
FIG. 4 illustrates the public key infrastructure and database infrastructure required to support point of interaction devices that use public key cryptography in accordance with a preferred embodiment of the invention.

FIG. 4 illustrates the public key and database infrastructure in accordance with a preferred embodiment. POI device 4000 includes a consortium public key 4100, a public key or a device public key certificate 4110, and the corresponding device private key 4120, which is stored in a tamper-proof memory. In devices in which, for example, storage space is at a premium, no other keys are required. However, if space permits, additional information can make it easier for the FI to determine device properties, minimizing the need to resort to a database. For example, a device manufacturer public key certificate 4130 may be included, which is signed by the consortium key so that the device's legitimacy may be verified without the use of a device properties database 4400. In particular, this is done by "chain validation." The device certificate in this case is signed by the device key, the manufacturer certificate is signed by the consortium key, and the consortium key is known to all parties in the transaction. Additionally, a device properties descriptor 4140 can be signed by the consortium manufacturer key. If both device manufacturer public key certificate 4130 and device properties descriptor 4140 are present, then device properties database 4400 is not needed as the FI can determine all relevant information about POI device 4000 from POI device 4000 itself in a way that cannot be falsified.

A FI 4200 includes a consortium public key 4300 (which is the same as consortium public key 4100), as well as a FI public key certificate 4310 signed by the consortium key, and the corresponding FI private key 4320, stored in a secure environment. POI device 4000 uses FI public key certificate 4310 to chain validate that FI 4200 is a member of the consortium. In this manner, POI device 4000 need not be aware of all banks that are part of the consortium. For example, a new consortium bank may have a certificate issued to it. Further, by setting a reasonably short expiration date for the certificates, it is possible to remove the ability of a bank to use the devices if it leaves the consortium, by not providing a new certificate after the current one expires.

Keys stored in the device may need to be changed periodically. For this purpose, the device 4000 may be programmed to allow new keys signed by the consortium private key to be installed into the tamperproof memory. The validity of the signature can be checked by use of the consortium public key 4100. In this manner, it is also possible to replace the consortium public key with an updated version prior to its expiration.

Device properties database 4400 is used to look up information about a POI device (e.g., POI device 4000) that is not conveyed by the POI device itself. Some examples of the types of information that can be stored include the following:

The device manufacturer as a function of the device public key certificate of the POI device. This information is advantageous if, for example, the POI device is so memory-restricted that the key cannot be signed.

The POI device properties as a function of the device public key certificate of the POI device. This is advantageous if, for example, the POI device does not have enough memory to store a signed description of its properties.

Allowed transactions as a function of the POI device properties. In practice, this information is most likely to be kept by the FI and will be specific to the policies set by the FI. For example, some smart-card reader devices reside in the floppy drive of a computer, but use the keyboard to enter a PIN to unlock the device. A FI may decide not to allow transactions from such a device, because the keyboard driver, floppy device driver, and the application program are all subject to attack, as discussed above. However, another FI may allow transactions from such a device.

Moreover, database 4400, which can be global in nature, need not transmit any keying information to the FIs. In particular, only information about POI device properties need be communicated to the FIs.

Figure 5:
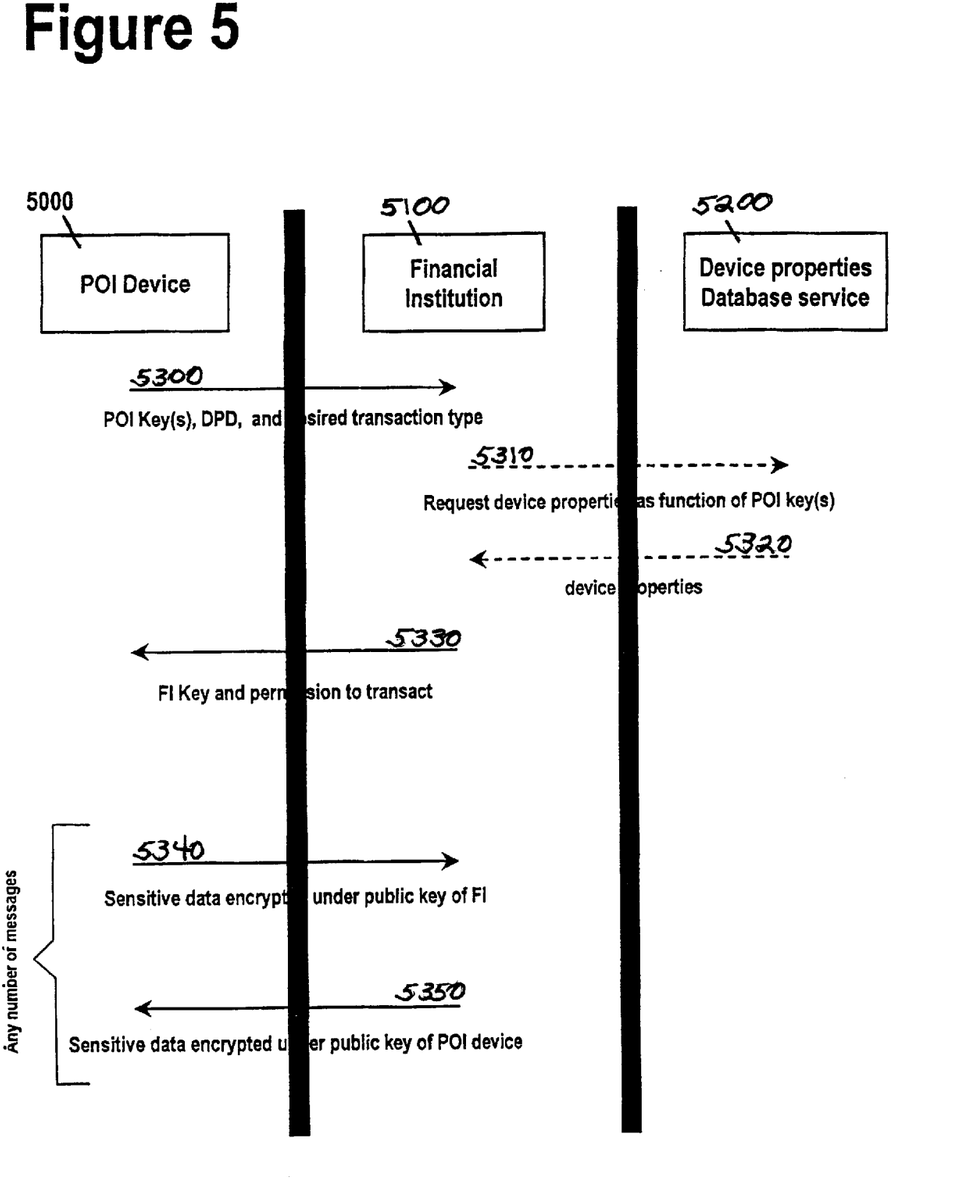
FIG. 5 illustrates the message flow between a point of interaction (POI) device, a financial institution (FI), and a device properties database service in accordance with a preferred embodiment of the invention.

FIG. 5 illustrates a flow of messages between a POI device 5000, a FI 5100, and a device properties database service 5200 (which may be part of FI 5100 or a separate service) in the case of a successful transaction in accordance with a preferred embodiment. When a consumer initiates a transaction from POI device 5000, POI device 5000 first sends a request 5300 for a transaction to FI 5100. In request 5300, POI device 5000 uploads its public key(s) or public key certificate(s), optionally the Device Properties Descriptor (DPD) if available, and the type of transaction described. FI 5100 can either determine the device properties from the certificates and the DPD, or it may need to query device properties database service 5200. If the latter is the case, then FI 5100 sends the service a request for device properties 5310 as a function of the POI key(s), and gets a device properties response 5320. Based on device properties response 5320, FI 5100 decides to give POI device 5000 permission to perform the transaction. In response message

5330, FI 5100 passes its public key certificate back to POI device 5000 so that POI device 5000 can validate the identity of FI 5100.

For the duration of the transaction, which may include any number of messages 5340, 5350 in either direction, POI device 5000 may encrypt sensitive data under the public key of FI 5100, so that only FI 5100 can decrypt the sensitive data. Likewise, FI 5100 may encrypt sensitive data destined for POI device 5000 under the public key of POI device 5000 so that only POI device 5000 can decrypt the sensitive data.

Using a preferred embodiment as described above allows FIs to move from their current mode of certifying devices that can communicate with their financial hosts to a new, more open mode. The current mode of certification entails the following:
1. Determine security profiles for acceptable device types including what types of transactions will be allowed from each type of device.
2. Certify specific device types from specific vendors.
3. Deploy devices in which the terminal ID of each device is known to the FI.
4. Reject transaction requests from devices whose terminal ID is not known.

In contrast, the new mode of certification in accordance with a preferred embodiment entails the following:
1. Determine type of device as a function of one or more public key certificates transmitted from the device itself, optionally using a database kept by the FI or operated by a third party.
2. Determine device properties (including security properties) as a function of the type of device.
3. Accept or reject transaction requests from the device based (in part) on the device properties.

Figure 6:
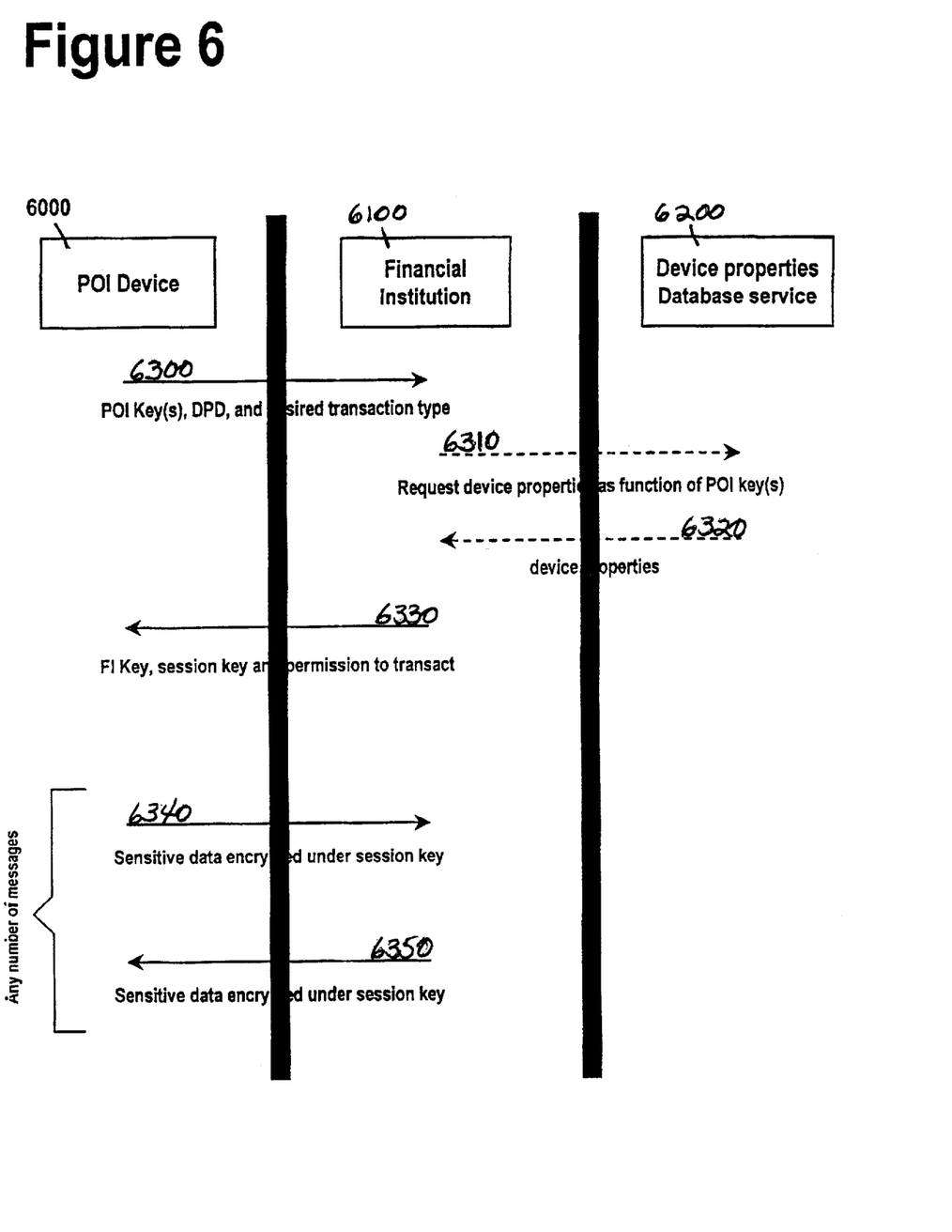
FIG. 6 illustrates the message flow between a POI device, a FI, and a device properties database service in which the public key encryption process overhead is minimized via the use of a shared symmetric key for channel encryption in accordance with a preferred embodiment of the invention.

FIG. 6 illustrates an optimized flow of messages between a POI device 6000, a FI 6100, and a device properties database service 6200 in accordance with a preferred embodiment. Because public key cryptography is a computationally expensive process, it is more efficient to use a symmetric key algorithm if significant encryption is required. In FIG. 6, messages 6300, 6310, and 6320 are the same as messages 5300, 5310, and 5320 of FIG. 5. However, in permission message 6330, FI 6100 includes a session key (which can be generated just for this transaction session and then discarded once the session is terminated), which can be for a more efficient bulk encryption algorithm such as DES. Hence, encryption in messages 6340 and 6350 can then use either the session key or the public keys.

Alternatively, the initial request and response messages between the POI device and the FI can be used to construct a session key (as opposed to having the FI provide one explicitly) for a more efficient encryption scheme such as DES. One such method of key generation is described by Diffie and Hellman.

Figure 7:
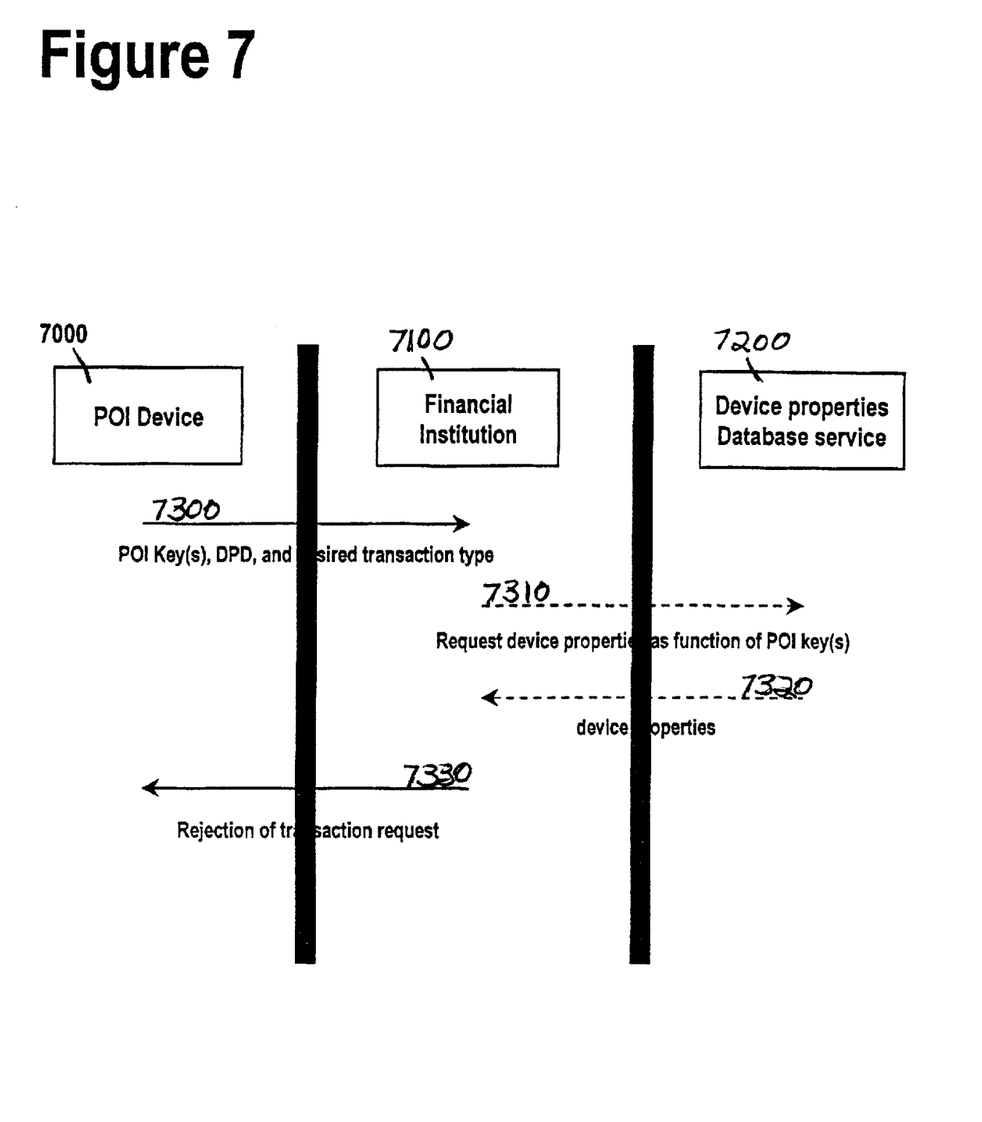
FIG. 7 illustrates the message flow between a POI device, a FI, and a device properties database service in which the FI chooses not to accept the transaction in accordance with a preferred embodiment of the invention.

FIG. 7 illustrates the flow of messages between a POI device 7000, a FI 7100, and a device properties database service 7200 in the case that FI 7100 rejects the request to perform a transaction of the indicated type in accordance with a preferred embodiment. In FIG. 7, messages 7300, 7310, and 7320 are the same as messages 5300, 5310, and 5320 of FIG. 5, respectively. However, if FI 7100 determines that the device properties are unacceptable for the type of transaction requested (e.g., based on the FI's own policies), then FI 7100 sends a rejection message 7330.

Further, if transaction request message 7300 from POI device 7000 is passed by the acquirer back to the card issuer, then a new mode of control by the card issuers is enabled in accordance with one embodiment. In particular, if the device properties passed to the card issuer, prior to the acquirer deciding whether to accept the transaction, are unacceptable to the card issuer, then the card issuer can decide not to accept the transaction. Thus, the card issuers rather than the acquirers can have the ultimate responsibility for (and control of) the safety of PINs and transaction integrity.

Although particular embodiments of the present invention have been shown and described, it will be obvious to those skilled in the art that changes and modifications can be made without departing from the present invention in its broader aspects and, therefore, the appended claims are to encompass within their scope all such changes and modifications that fall within the true scope of the present invention.

What is claimed is:

1. A method for consummating an electronic transaction between a first electronic device and a second electronic device, comprising:
    establishing a communication between the first electronic device and the second electronic device via a communication linkage;
    transmitting a request to perform a transaction from the first electronic device to the second electronic device;
    determining an appropriate response to said request based on properties of the first electronic device provided by a device properties database;
    transmitting a response from the second electronic device to the first electronic device;
    validating the identity of the second electronic device based on information transmitted by the second electronic device; and
    initiating the transaction between the first electronic device and the second electronic device.

2. The method as recited in claim 1, wherein the information transmitted by the first electronic device comprises an indicator that indicates whether the first electronic device is certified by a certificate authority.

3. The method as recited in claim 1, wherein the request comprises cryptographic information identifying the first electronic device to the second electronic device, and a type of transaction.

4. The method as recited in claim 1, wherein the response comprises cryptographic information identifying the second electronic device to the first electronic device, and approval to proceed with the transaction, the approval being based at least in part on device security properties of the first electronic device.

5. The method as recited in claim 1, wherein keying information in the response is used for encryption and secure transmission of the transaction.

6. The method as recited in claim 1, wherein keying information in the request and the response is used to generate a session key for encryption and secure transmission of the transaction.

7. The method as recited in claim 1, wherein keying information in the response uses public key cryptography.

8. The method as recited in claim 7, wherein the request comprises a first public key certificate, and the response comprises a second public key certificate.

9. The method as recited in claim 8, wherein the first electronic device and the second electronic device each comprise a consortium key to validate the first public key certificate and the second public key certificate.

10. The method as recited in claim 1, wherein public key information is stored in a tamper-proof memory of the first electronic device.

11. The method as recited in claim 1, wherein at least one communication linkage uses Internet Protocol (IP).

12. The method as recited in claim 1, wherein the first electronic device comprises a point of interaction device, and the properties comprise device security properties of the point of interaction device.

13. The method as recited in claim 12, wherein the second electronic device comprises an acquirer device or a card issuer device.

14. A computer program embodied on a computer-readable medium for consummating an electronic transaction between a first electronic device and a second electronic device, comprising:
   a code segment that establishes a communication between the first electronic device and the second electronic device via a communication linkage;
   a code segment that transmits a request to perform a transaction from the first electronic device to the second electronic device;
   a code segment that determines an appropriate response to said request based on properties of the first electronic device provided by a device properties database;
   a code segment that transmits a response from the second electronic device to the first electronic device;
   a code segment that validates the identity of the second electronic device based on information transmitted by the first electronic device; and
   a code segment that initiates the transaction between the first electronic device and the second electronic device.

15. The computer program as recited in claim 14, wherein the information transmitted by the first electronic device comprises an indicator that indicates whether the first electronic device is certified by a certificate authority.

16. The computer program as recited in claim 14, wherein the request comprises cryptographic information identifying the first electronic device to the second electronic device, and a type of transaction.

17. The computer program as recited in claim 14, wherein the response comprises cryptographic information identifying the second electronic device to the first electronic device, and approval to proceed with the transaction, the approval being based at least in part on device security properties of the first electronic device.

18. The computer program as recited in claim 14, wherein keying information in the response is used for encryption and secure transmission of the transaction.

19. The computer program as recited in claim 14, wherein keying information in the request and the response is used to generate a session key for encryption and secure transmission of the transaction.

20. The computer program as recited in claim 14, wherein keying information in the response uses public key cryptography.

21. The computer program as recited in claim 20, wherein the request comprises a first public key certificate, and the response comprises a second public key certificate.

22. The computer program as recited in claim 21, wherein the first electronic device and the second electronic device each comprise a consortium key to validate the first public key certificate and the second public key certificate.

23. The computer program as recited in claim 14, wherein public key information is stored in a tamper-proof memory of the first electronic device.

24. The computer program as recited in claim 14, wherein at least one communication linkage uses Internet Protocol (IP).

25. The computer program as recited in claim 14, wherein the first electronic device comprises a point of interaction device, and the properties comprise device security properties of the point of interaction device.

26. The computer program as recited in claim 25, wherein the second electronic device comprises an acquirer device or a card issuer device.

27. A method for determining device security properties of a point of interaction device, comprising:
   receiving a request to perform a transaction from the point of interaction device at a first electronic device via a communication linkage; and
   retrieving from a database the device security properties of the point of interaction device based on the request.

28. The method as recited in claim 27, wherein the request comprises information that indicates whether the point of interaction device is certified by certificate authority.

29. The method as recited in claim 27 further comprising:
   transmitting a response from the first electronic device to the point of interaction device via the communication linkage, the response comprising approval to proceed with the transaction, the approval being based at least in part on the device security properties of the point of interaction device.

30. The method as recited in claim 27, wherein at least one communication linkage uses Internet Protocol (IP).

31. The method as recited in claim 27, wherein the first electronic device comprises an acquirer device or a card issuer device.

32. The method of claim 1, wherein said input device is a keyboard.

33. The computer program of claim 14, wherein said input device is a keyboard.

34. The method of claim 27, wherein said input device is a keyboard.

* * * * *